(12) United States Patent
Soto Velasco (10) Patent No.: US 11,634,193 B2
(45) Date of Patent: Apr. 25, 2023

(54) AUTOMATIC LOCKING/UNLOCKING SYSTEM FOR TRACTION SYSTEMS, ACTUATED BY PEDAL LEVERS

(71) Applicant: Servando Soto Velasco, Jalisco (MX)

(72) Inventor: Servando Soto Velasco, Jalisco (MX)

(*) Notice: Subject to any disclaimer, the term of this patent is extended or adjusted under 35 U.S.C. 154(b) by 222 days.

(21) Appl. No.: 17/052,202

(22) PCT Filed: Aug. 27, 2018

(86) PCT No.: PCT/MX2018/000077
§ 371 (c)(1),
(2) Date: Nov. 1, 2020

(87) PCT Pub. No.: WO2020/046097
PCT Pub. Date: Mar. 5, 2020

(65) Prior Publication Data
US 2021/0362804 A1 Nov. 25, 2021

(30) Foreign Application Priority Data
Aug. 27, 2018 (MX) .................... MX/a/2018/010336

(51) Int. Cl.
*B62M 3/00* (2006.01)
*B62M 1/24* (2013.01)
(Continued)

(52) U.S. Cl.
CPC ................ *B62M 1/24* (2013.01); *B62M 1/36* (2013.01); *B62M 3/00* (2013.01); *B62M 3/08* (2013.01)

(58) Field of Classification Search
CPC .......... B62M 3/00; B62M 3/003; B62M 3/08; B62M 1/24; B62M 1/26; B62M 1/28;
(Continued)

(56) References Cited

U.S. PATENT DOCUMENTS

| 4,650,049 A | 3/1987 | Stephens |
| 2010/0167881 A1 | 7/2010 | Day |

(Continued)

FOREIGN PATENT DOCUMENTS

| CN | 108482533 | 9/2018 |
| DE | 102016001286 | 8/2016 |

(Continued)

OTHER PUBLICATIONS

Machine Translation of FR-3046985-A1.*
Machine Translation of WO-2006128611-A1.*
Machine Translation of DE 10 2006 001 286.*

*Primary Examiner* — Brian J McGovern
(74) *Attorney, Agent, or Firm* — CRGO Global; Steven M. Greenberg (57) ABSTRACT

A locking/unlocking system for traction systems actuated by pedal levers, which includes: a blocking element (1); a receiving element (10); an automatic activation means (3) for coupling and uncoupling the blocking element (1) of the receiving element (10); at least, a control means (16) for controlling the automatic activation means (3); at least, a switch (15a, 15b) for turning the control means on and/or off (16); and at least, a power source (17).
A pedal lever (9) for traction systems actuated by pedal levers, which includes: a locking/unlocking system, in accordance with this invention.
A traction system actuated by pedal levers, which in turn includes: a pedal lever (9) in accordance with this invention on each of the two ends of the central axis (8), which is introduced and fastened to the adapter (7) of the freewheel (6), or directly onto the freewheel (6) of the lever (9).

20 Claims, 11 Drawing Sheets

(51) Int. Cl.
*B62M 1/36* (2013.01)
*B62M 3/08* (2006.01)

(58) Field of Classification Search
CPC .. B62M 1/32; B62M 1/36; B62M 1/38; F16D 41/24
See application file for complete search history.

(56) References Cited

U.S. PATENT DOCUMENTS

2017/0283006 A1* 10/2017 Schuster ................. F16H 55/54
2022/0126937 A1* 4/2022 Song ........................ B62M 6/45

FOREIGN PATENT DOCUMENTS

| | | | | |
|---|---|---|---|---|
| FR | 3046985 | A1 * | 7/2017 | |
| JP | 2989173 | | 12/1999 | |
| WO | WO-2006128611 | A1 * | 12/2006 | .............. B62L 5/003 |

* cited by examiner

AUTOMATIC LOCKING/UNLOCKING SYSTEM FOR TRACTION SYSTEMS, ACTUATED BY PEDAL LEVERS

CROSS-REFERENCE TO RELATED APPLICATIONS

This application is a § 371 national phase entry of International Application No. PCT/MX2018/000077, filed Aug. 27, 2018.

TECHNICAL FIELD OF THE INVENTION

This invention is related to the Mechanical, Electrical and Electronic technical fields since it provides an automatic locking/unlocking system and a pedal lever for traction systems actuated by pedal levers.

BACKGROUND OF THE INVENTION

Currently, machines actuated by pedal levers with coupling systems (U.S. Pat. No. 7,607,370 B2 and WO 03101815 A1) present the problem that the said coupling systems have to be actuated manually, which results in the user being distracted and taking his eyes off the road in order to bend down for coupling or decoupling the system, unlike this invention in which the cyclist can engage the coupling or decoupling system directly from the handlebar without the use of cables, or directly with the foot without taking either hand off the handlebar, nor the eyes from the road.

The patent document U.S. Pat. No. 7,607,370 (B2) divulges cranks for use in machines propelled by humans, such as bicycles and crank-actuated exercise machines, and refers specifically to a crank equipped with a unidirectional clutch and a coupler that can arrange to be coupled so as to prevent the shaft to rotate in the opposite direction to the axis of the crank.

What is divulged in this document is a crank set that can be used to propel a crankshaft in two modes. In the first mode, a unidirectional shaft must allow the free rotation of the crank with respect to the crankshaft, yet couple the crank to the crankshaft manually when the crank moves in an opposite rotation direction. In the second mode, the crank must be vigorously coupled to the axis in order to propel the axis in any direction, and the mechanism must be able to move between the two modes in a simple and swift manner.

The crank in document U.S. Pat. No. 7,607,370 (B2) includes an associated mechanism through which a crank arm can be attached drivingly to a crankshaft and can be used in a first mode to propel the crankshaft in one direction of rotation, but allowing free rotation on the crankshaft in an opposite rotational direction.

In one embodiment a coupler is carried movably on an inner end of the crank arm and is movable between an engaged or coupled position and a disengaged or uncoupled condition. In one embodiment engagement of the coupler results in the crank arm being held in a predetermined angular position with respect to the crankshaft or a hub portion of the crank attached to the crankshaft.

Figure 1:
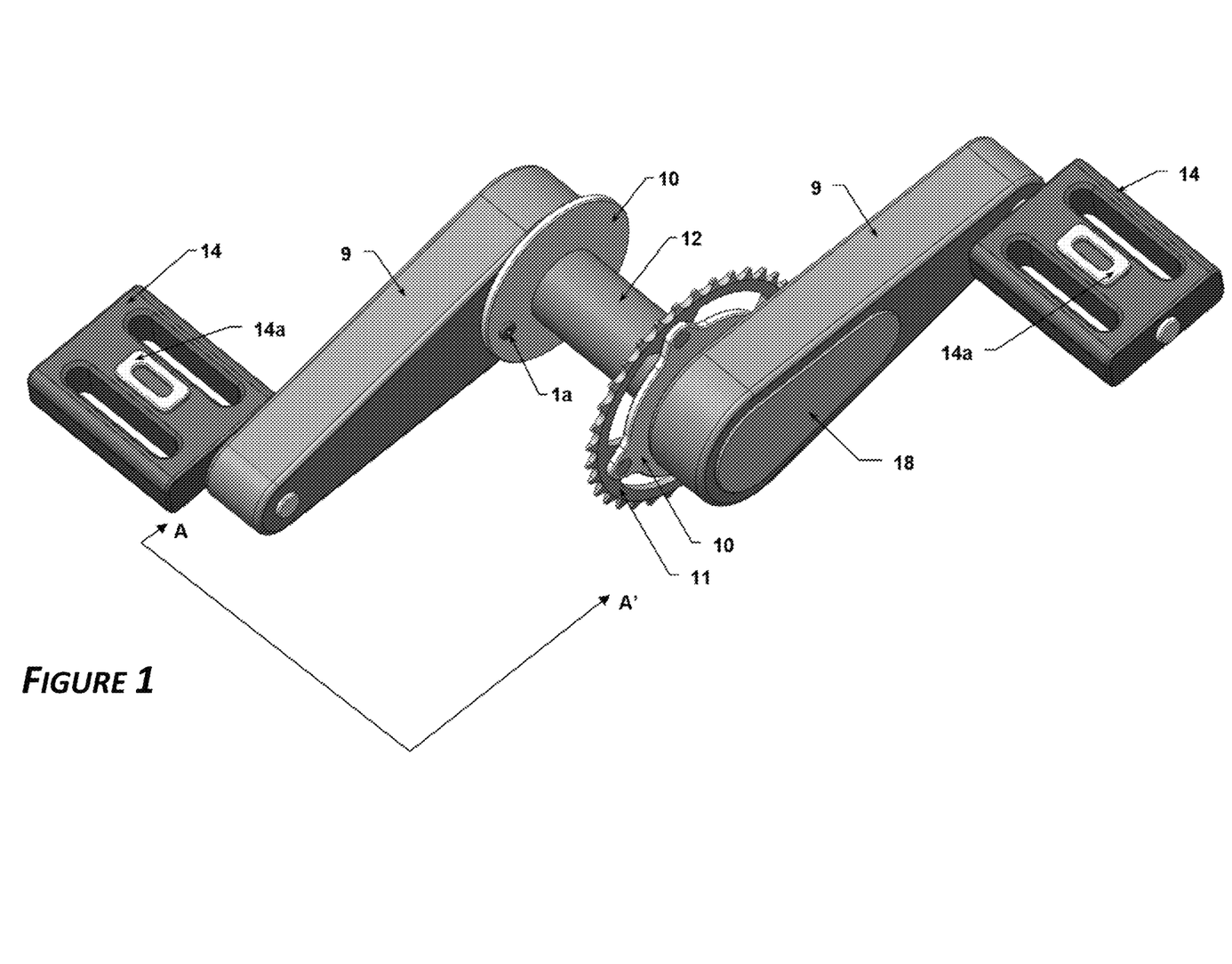
FIG. 1 is a view from a conventional perspective of a traction system with its pedal levers, in accordance with the present invention, which illustrates the pedal levers coupled at a position of 180° between them, so as to produce a circular pedaling motion.
Figure 2:
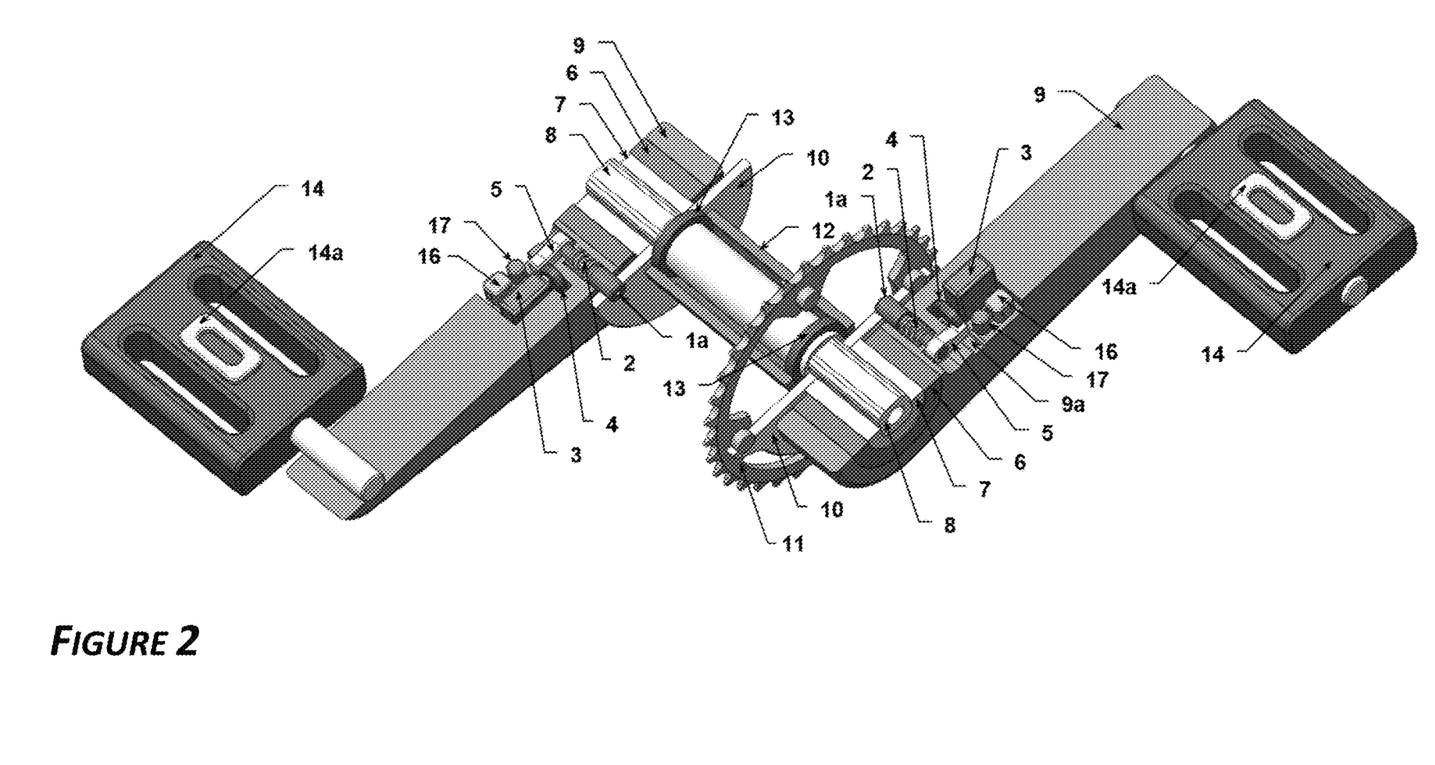
FIG. 2 is a sectioned view A-A' of FIG. 1, in which the components of the traction system can be observed in its coupled state.
Figure 3:
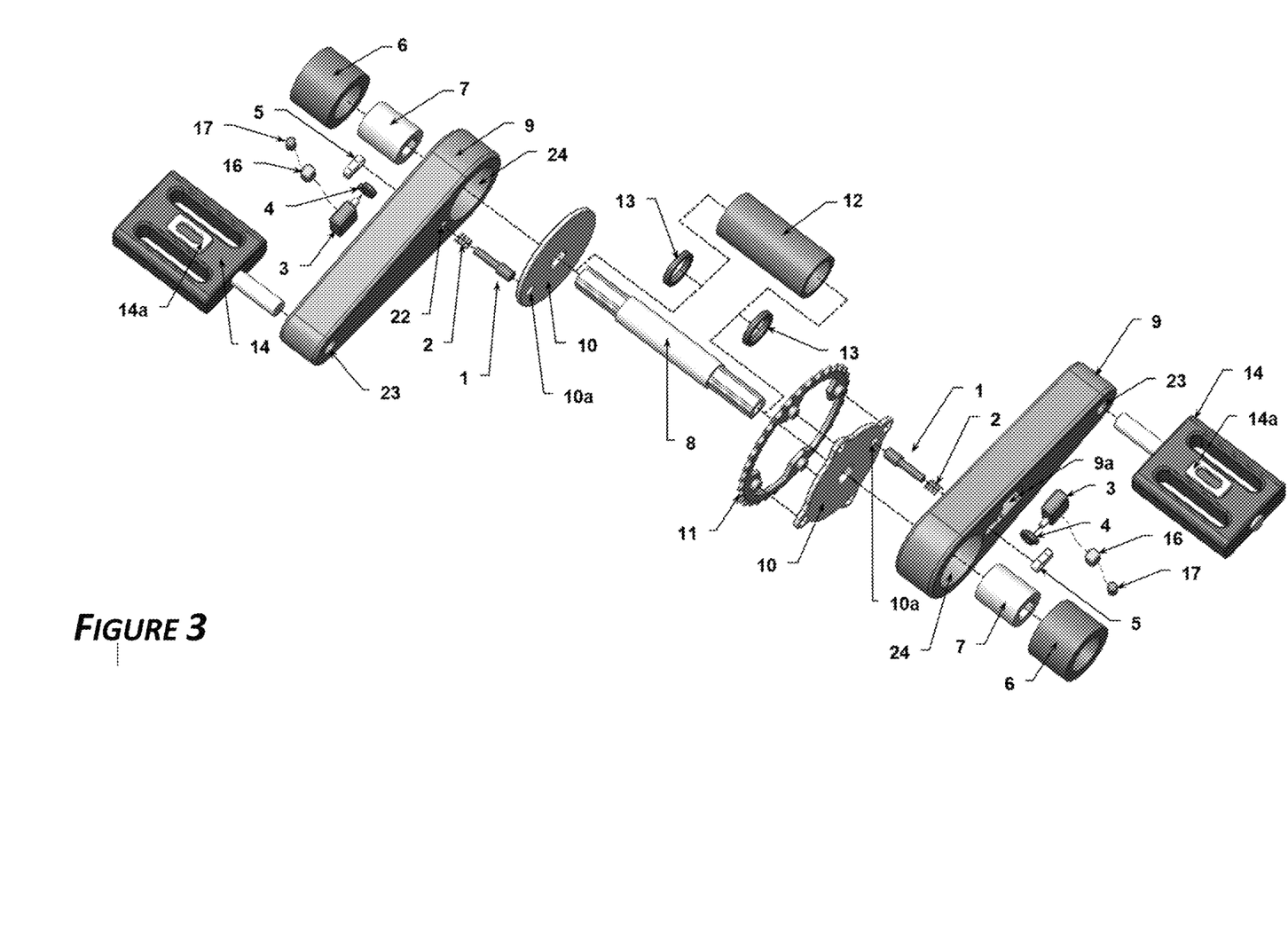
FIG. 3 is an exploded view of FIG. 1.
Figure 4:
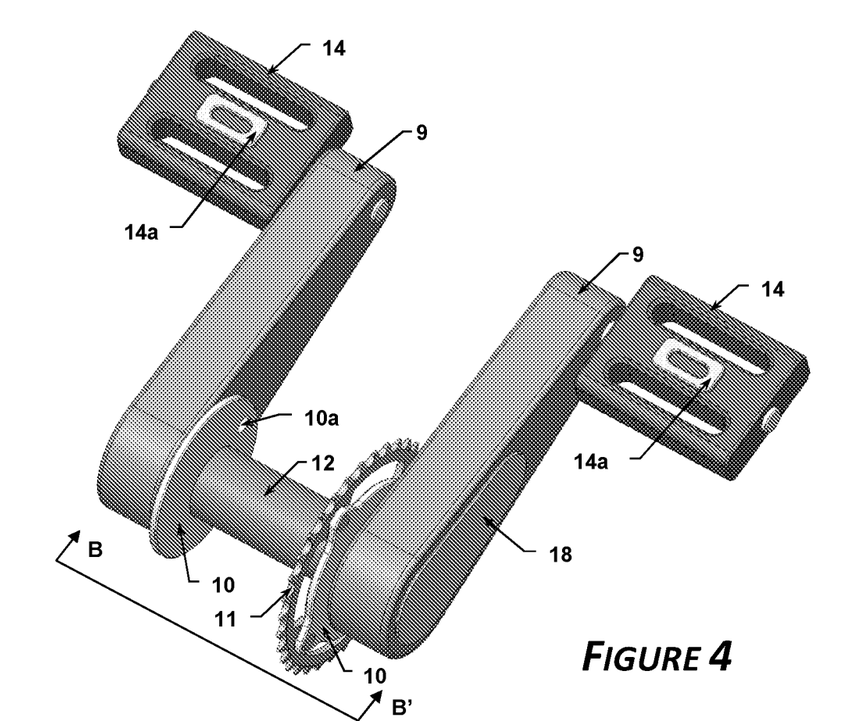
FIG. 4 is a view from a conventional perspective of the traction system of the present invention which illustrates the uncoupled pedal levers, resulting in an independent pedaling for each pedal.
Figure 5:
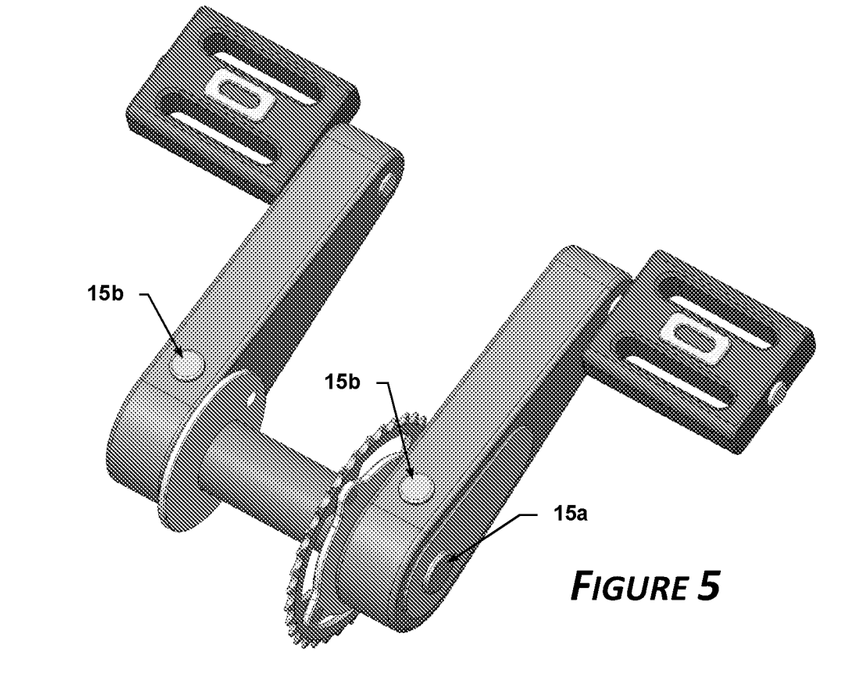
FIG. 5 is a view from a conventional perspective of the previous figure, which illustrates some switches.
Figure 6:
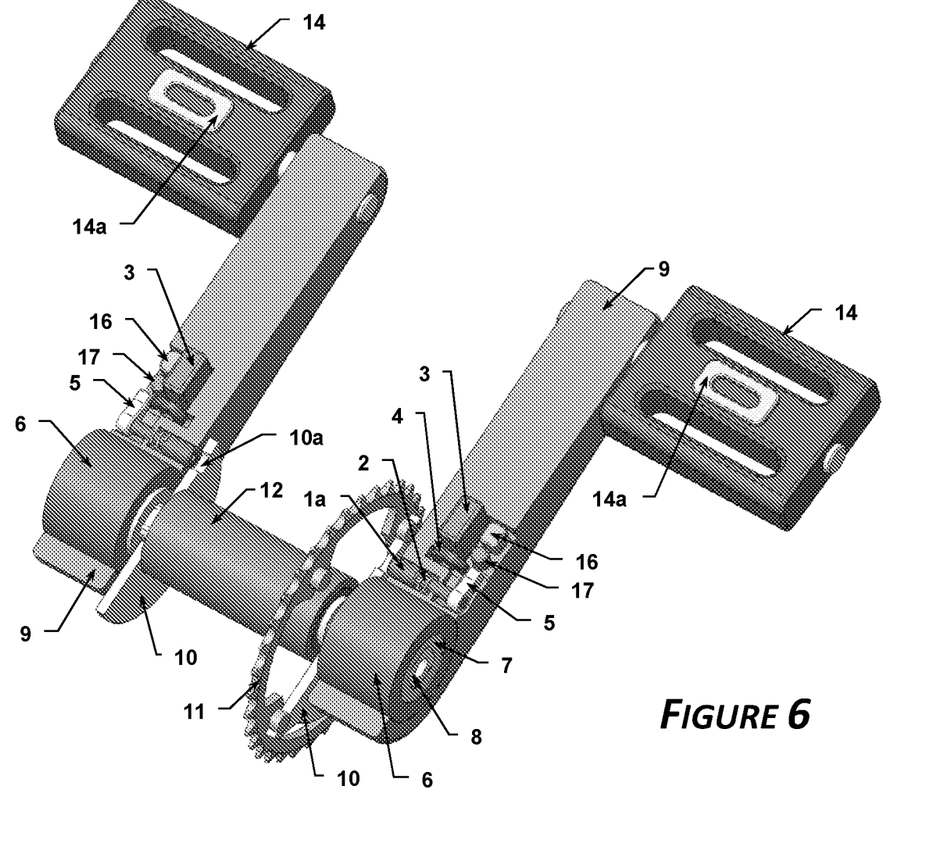
FIG. 6 is a longitudinal section B-B' of FIG. 4, in which the placement of the components of the traction system can be observed.
Figure 7:
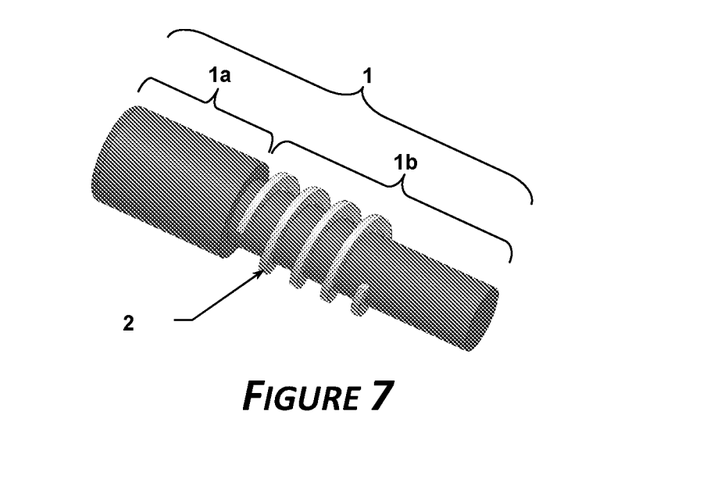
FIG. 7 is a view from a conventional perspective of a blocking element which is part of the locking/unlocking system of the present invention.
Figure 8:
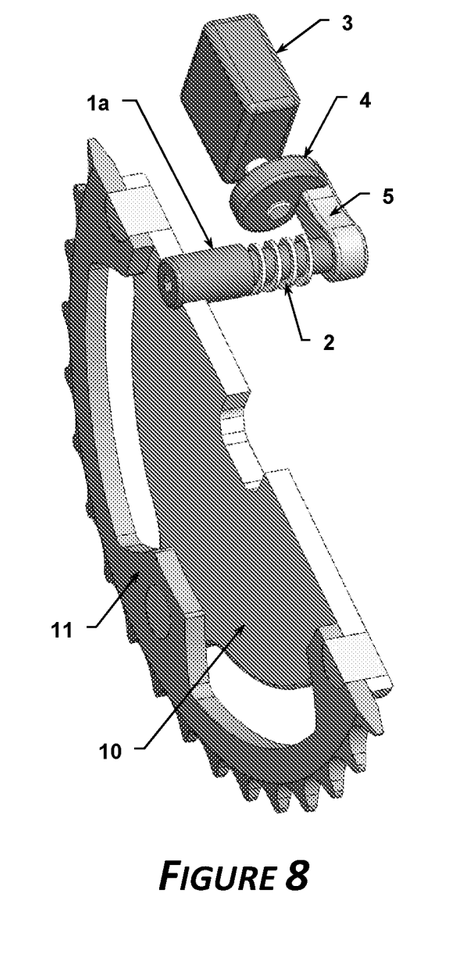
FIG. 8 is a view from a conventional perspective of a section of the locking/unlocking system, in which a mode can be observed of the means that activate the blocking element in a blocking state.
Figure 9:
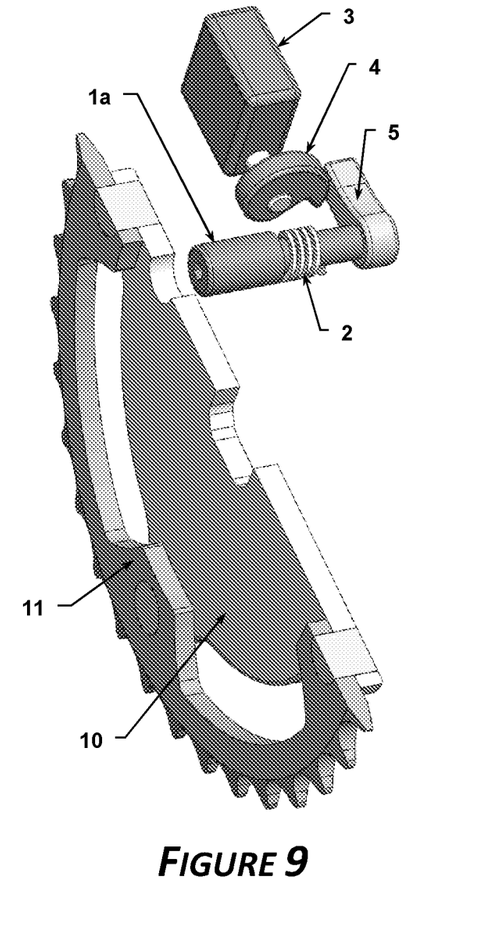
FIG. 9 is the view of the same figure as above, but in an unblocking state.
Figure 10:
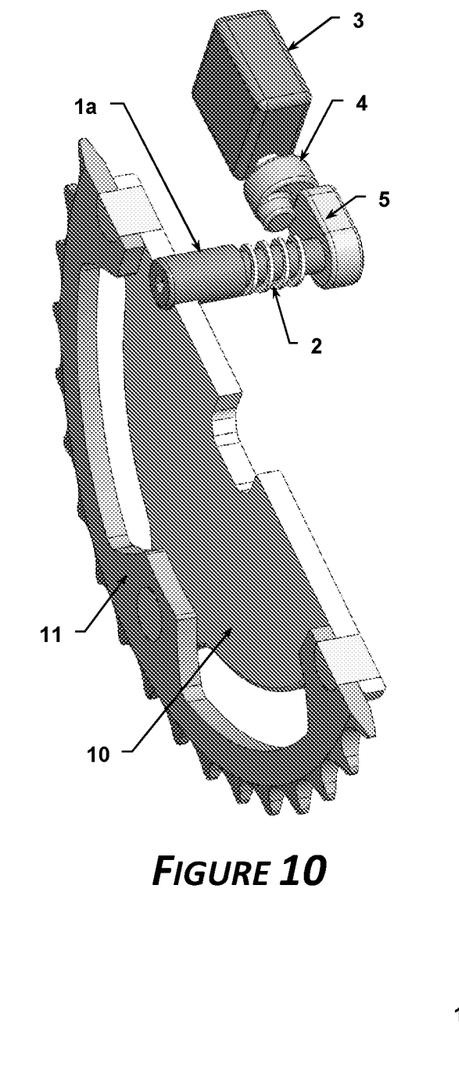
FIG. 10 is a view from a conventional perspective of a section of the locking/unlocking system, in which another mode can be observed of the means that activate the blocking element in a blocking condition.
Figure 11:
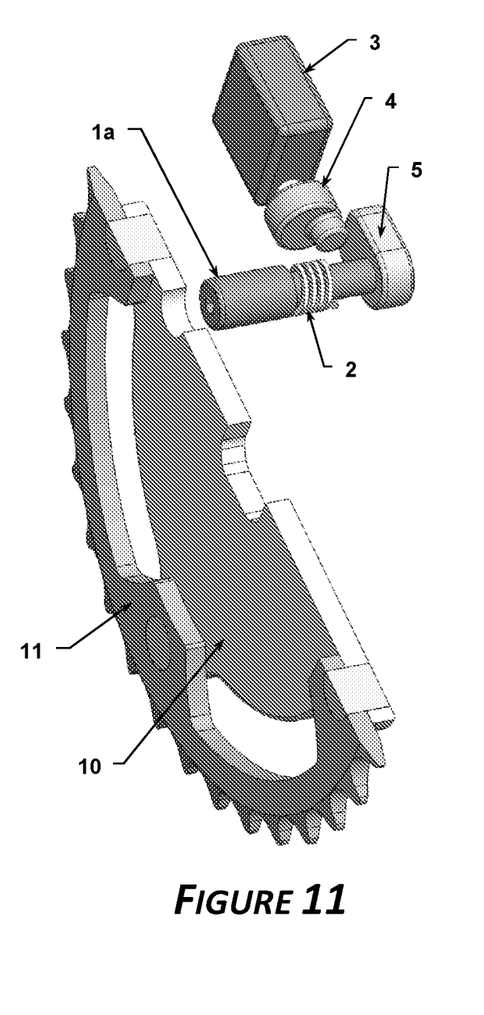
FIG. 11 is the same view of the previous figure, but in an unblocked state.
Figure 12:
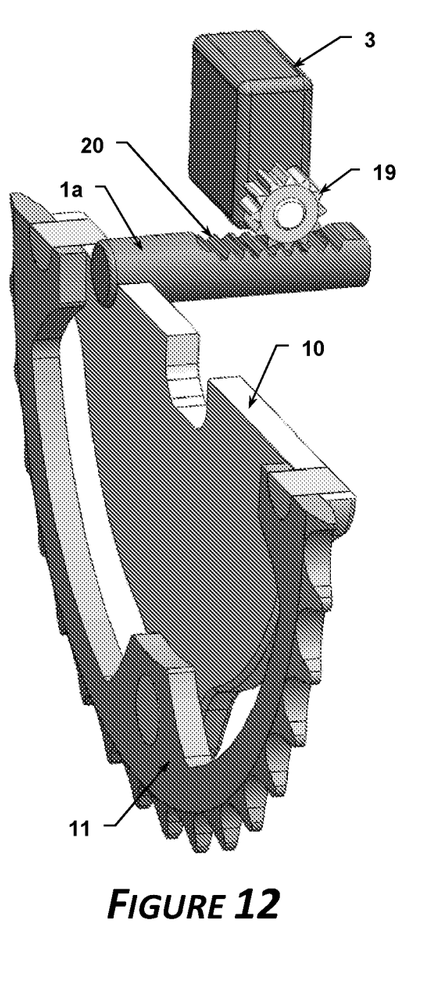
FIG. 12 is a view from a conventional perspective of a section of the locking/unlocking system, in which a mode can be observed of the blocking element and the means that activate it, in a blocking condition.
Figure 13:
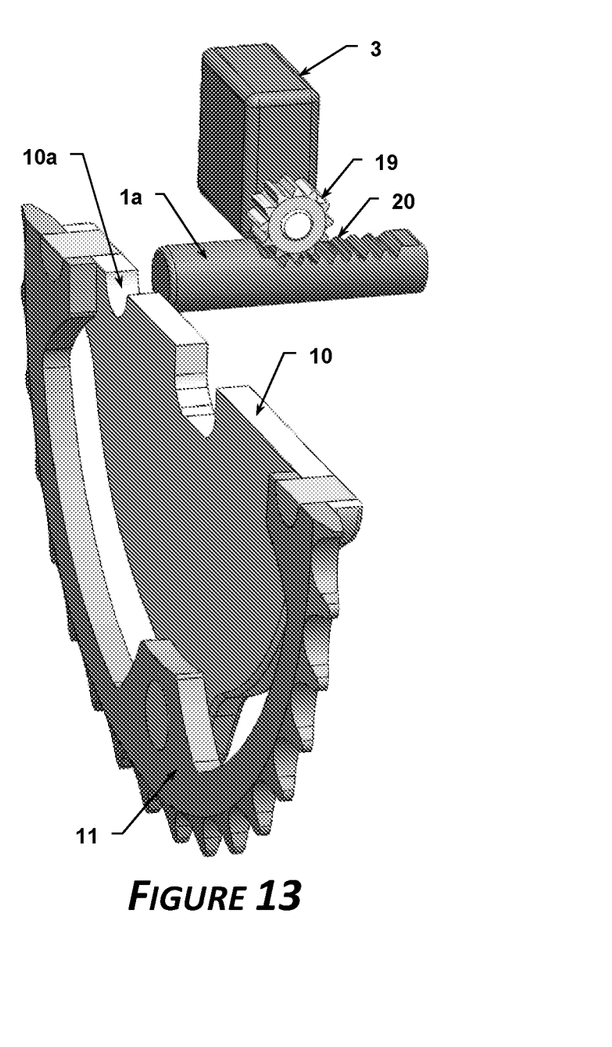
FIG. 13 is the same view of the previous figure, but in an unblocking condition.
Figure 14:
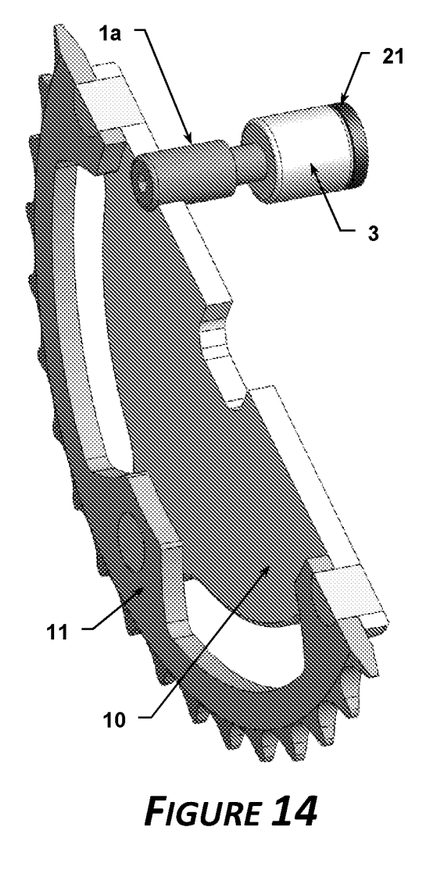
FIG. 14 is a view from a conventional perspective of a section of the locking/unlocking system, in which another mode can be observed of the blocking element and of the means that activate it, in a blocking condition.
Figure 15:
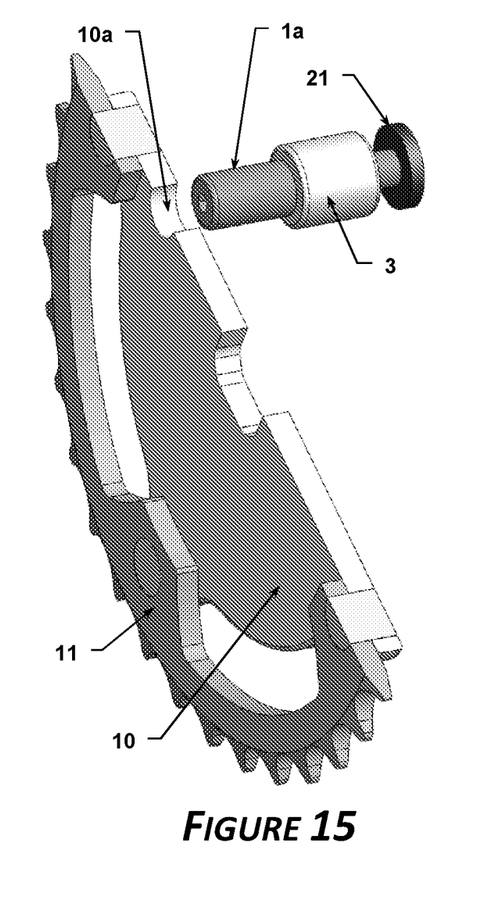
FIG. 15 is the same view of the previous figure, but in an unblocking condition.
Figure 16:
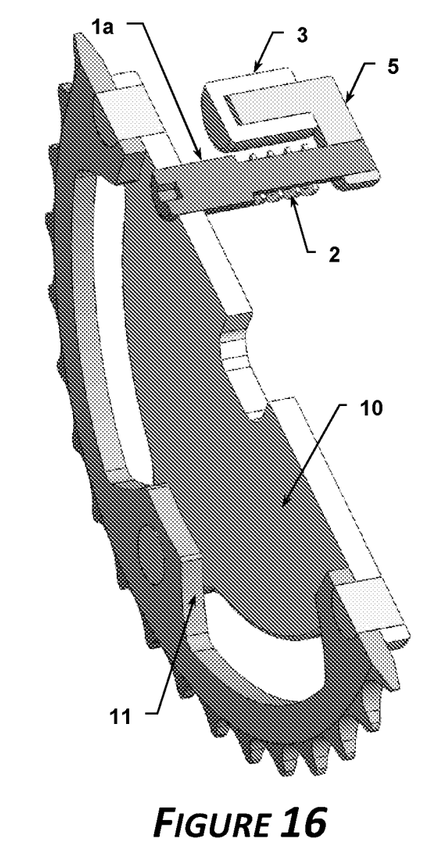
FIG. 16 is a view from a conventional perspective of a section of the locking/unlocking system, in which another embodiment can be observed of the means that activate the blocking element, in a blocking condition.
Figure 17:
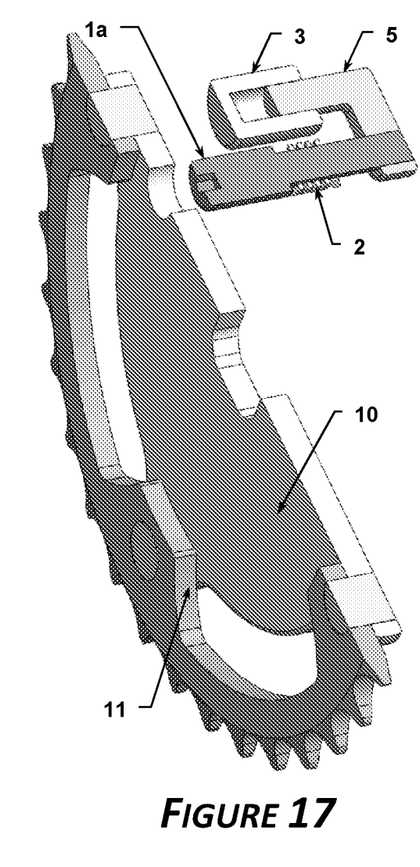
FIG. 17 is the same view of the previous figure, but in an unblocking condition.
Figure 18:
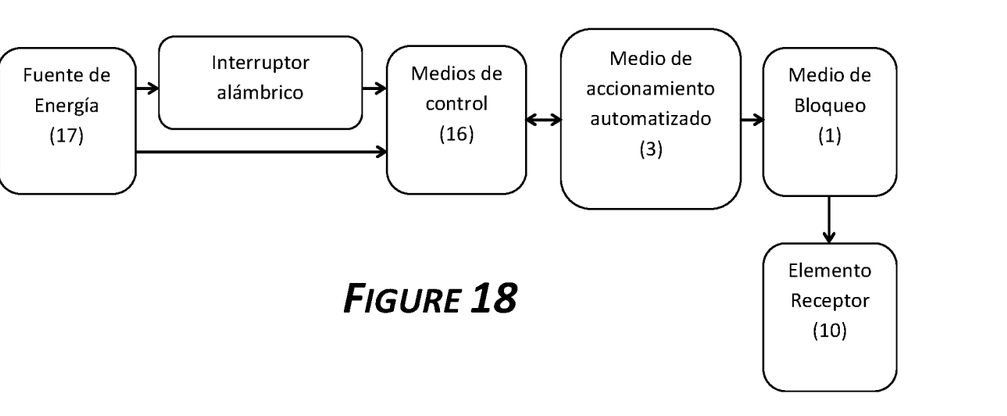
FIG. 18 is a block diagram of the locking/unlocking system of the present invention.
Figure 19:
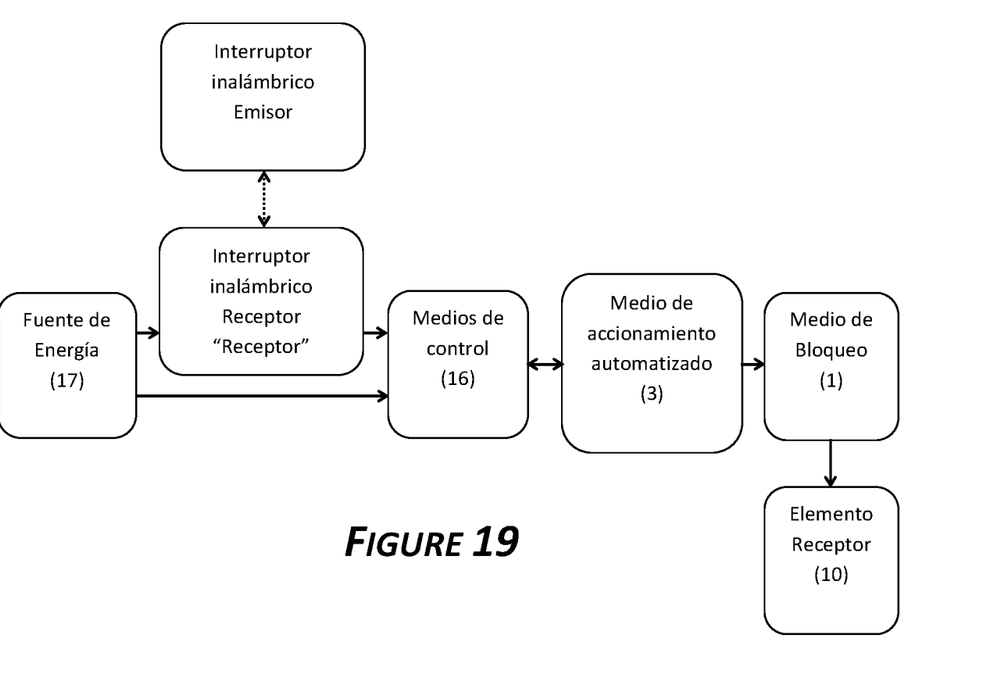
FIG. 19 is a block diagram of the locking/unlocking system of the present invention which illustrates the inclusion of a switch.

In FIG. 1 a crank assembly 10 can be observed which includes a crank arm 12, of a suitable material such as an aluminum alloy, that has a radially inner end 14 adapted to be attached to an end of a crankshaft as will be described in more detail presently, and an outer end 16. The crank arm 12 as shown herein is equipped with an array 18 of parallel grooves and ridges and a set of threaded bores 20, to accept adjustable attachment of a pedal at a selected location to provide a desired effective crank arm length, but it will be apparent that the crank could also be manufactured in a selected length with a conventional threaded bore (not shown) to accept a pedal or handle, depending upon the use to which the crank assembly 10 is intended to be put. FIG. 2 illustrates a pair of crank assemblies 10L and 10R, equipped with their respective pedals 22, and each crank assembly 10L, 10R is attached to a respective one of a pair of opposite ends of a power input shaft, such as a crank shaft 30, shown in simplified form, without the supporting bearings that would be necessary, such as the bearings in the bottom bracket of a bicycle or an exercise machine.

As for patent document WO03101815 (A1), it describes a pedal crankshaft enhanced by a freewheel; in which the crankshaft, according to the invention, has at least a fixed means that permits traveling with a free wheel depending on the rotation direction or coupling a torsion movement to both rotation directions. In particular, the crankshaft, according to the invention, can be used as a pedal crankshaft in bicycles and other forms of locomotion or training or exercise machines built in a similar manner. However, the area of application is not limited to this. It can also be used, for example, in manually activated equipment in which a switch is desired between an enhanced change of phase or synchronous movement in phase and gear with a freewheel.

FIGS. 1 and 2 of document WO03101815 (A1), illustrate a first embodiment in which an adapter 1 with a receiving opening 10 of an axis of a crankshaft of a bicycle or another device. The receiving opening 10 is used for a fixed and rotatory connection of adapter 1 to the axis of the crankshaft and as a consequence of this it generally has a square transverse section. The adapter has a cylindrical main body which is preferably equipped with a boss on the side of the axis of the crankshaft. A single direction or freewheel coupling is mounted to adapter 1. This coupling is fixed to an arm 3 of the crankshaft in a rotatory manner. To this purpose, arm 3 of the crankshaft on one end has a 3" cylindrical housing which accommodates sleeve 2 of the freewheel. If the crankshaft is used as a pedal crankshaft, a pedal can be connected to the other end of arm 3. The 3" housing, sleeve 2 of the freewheel and adapter 1, are preferably connected between them and in relation to the axis of the crankshaft by way of thread joints. Adapter 1 and sleeve 2 of the freewheel, form a freewheel coupling. In other words, a rotation of arm 3 of the crankshaft in a first rotation direction transmits a torsion moment to the axis of the crankshaft and in this way also to the bicycle chain or other activation element. In the case of opposite direction rotation, arm 3 of the crankshaft works freely. The moment of torsion produced decouples from adapter 1 and, as a consequence, from the axis of the crankshaft. As mentioned at the beginning, a synchronized phase gear change of the two pedals is only possible if the cyclist exerts on each individual pedal a uniform force through time. Furthermore, thanks to this clutch the pedals can also rotate in phase, increasing training and the available therapy options. According to the invention there is at least one means of fastening, which permits the optional change of this single direction coupling into a double-direction coupling, since the moment of torsion is transmitted to the axis of the crankshaft in both rotation directions. The example illustrated here, the means of fastening is a blocking pin 6 on a spring that passes through an opening of the 3" housing, which can be connected to the receiving opening 40 of a disc-cap 4. The disc-cap 4 is placed in a rotationally fixed manner on the adapter 1 or on another element that is rotationally fixed to the axis of the crankshaft. Blocking pin 6 is activated through a rotating ring 5 placed concentrically around disc-cap 4 so that it may rotate around it. There is a surrounding cavity between the 3" housing and the rotating ring 5. As can be observed in FIG. 1, an elastic band 8 placed over the surface of the inner ring of rotating ring 5 projects into the interior of the said cavity. Elastic band 8 is preferably fastened to rotating ring 5 through a 10' rivet. Turning ring 5 clockwise, the blocking pin 6, introduced into the 3" housing is pushed in the direction of receiving opening 40 of the disc-cap 4 against the force of a return spring 7, which results in a blocking connection between arm 3 and the axis of the crankshaft. In order to prevent the rotating ring 5 to rotate in excess, the said ring preferably has a block pin 9 that projects toward the cavity in a position adjacent to elastic band 8 and supports against blocking pin 6 in its blocked state. Blocking pin 6 acts as driving force of disc-cap 4, resulting in torque being transmitted from arm 3 of the crankshaft to the axis of the crankshaft, even when sleeve 2 is in motion with the freewheel. If rotating ring 5 rotates in the opposite direction, blocking pin 6 slides outward along elastic band 8 and releases disc-cap 4 once more. In this state, the transmission of the torsion moment takes place immediately and in a single rotation direction.

As can be seen in document WO03101815 (A1), there is a large number of blocking and coupling elements and the crankshaft is completely mechanical and manual, and lacks an electronic device that makes it automatic.

Therefore, in order to counteract the above-mentioned inconveniences, a locking/unlocking system and a pedal lever were developed for traction systems actuated by pedal levers. The characterizing details of the said locking/unlocking system, pedal lever and traction system, are clearly shown in the description of some of their embodiments, which are supported with some examples and figures presented by way of illustration and not limitation, in which:

DETAILED DESCRIPTION OF THE INVENTION

The locking/unlocking system for traction systems actuated by pedal levers proposed by this invention is composed of:

A blocking element (1) which has a coupling section (1a) and a push and retraction section (1b), which is configured to interact with some element that pushes and/or pulls the blocking element (1). For example, the said configuration of the push and retraction section (1b) can be: a zipper (20); a non-skid area; a thread; a perforation; a tongue-and-groove section; a magnetic section; or a section that is thinner or thicker than the coupling section (1a), to which a spring is added externally (2) and/or directly through the use of an automatic activation device (3).

A mode of the system in question is when the blocking element (1) includes a fastening element (21) located on the free end of the push and retraction section (1b) when the said blocking element (1) is directly connected to the automatic activating device (3). The fastening element (21) can be a block, a pin, a ring, a thickening, a fold, a boss, a protuberance, a combination of some of the above, etc.

An embodiment of the system in accordance with the present invention is when the blocking element (1) is: a bolt, a screw, a piston, an axle, a bar, among others.

The said locking/unlocking system for traction systems actuated by pedal levers, must also include a receiving element (10) which has at least a coupling means (10a) for coupling to the coupling section (1a) of the blocking element (1), in which the said receiving element (10) is concentrically fixed to the rotating axis (8) of a traction system actuated by pedal levers. The receiving element (10) may be: a disc, a polygon, a preferably flat piece with an irregular perimeter, or a star, and its coupling means can be: a perforation (10a), a groove, a cleft and/or a boss, to mention some examples.

A mode of the blocking/unblocking system, in accordance with this invention, is that it also includes a conduction element (11) which can be a star with its chain; a pulley with its belt, cable, rope or band; or a cogwheel with its cog.

Therefore, the locking/unlocking system has an automatic activating means (3) that moves the blocking element (1) through its pull and retraction section (1b), in order to couple it and decouple it through the coupling means (10a) of the receiving element (10). The preferable embodiment of which is when the automatic activating device (3) is an actuator; and the actuator is in turn selected from the following group: electronic actuators, hydraulic actuators, pneumatic actuators, electric actuators, piezoelectric actuators, electromechanical actuators and electromagnetic actuators.

A preferable embodiment of the locking/unlocking system is when the electronic actuator is a motor, servomotor or stepper motor.

Another preferable mode of the locking/unlocking system is when the electromagnetic actuator is a solenoid.

The locking/unlocking system in question also includes at least a control means (16) for controlling the automatic activating device (3); in which the control means (16) is selected from the following group: electric and/or electronic circuits; integrated circuits; position limiting means, and/or sensors.

The locking/unlocking system also has at least one switch (15a, 15b) for turning on or off at least one control means (16); the said switch (15a, 15b) can be either wired or wireless and is located at a place that is easily accessed and manipulated by the user.

Finally, the said locking/unlocking system includes at least a power source (17) for powering at least the control means (16) and/or the automatic activation device (3). The power source (17) is selected from the following group: batteries, power units, solar cells, energy generators and/or a combination of the above.

An additional mode of the locking/unlocking system, in accordance with the present invention, is when it also includes connecting means that connect the blocking element (1) to the automatic activation device (3); in which the said connecting means make direct contact with the push and/or retraction section (1b) of the blocking element (1) and may be: clogs (19), a lever (5) fastened to the end of the push and/or retraction section (1b) of the blocking element (1); or a combination of the said lever (5) with a cam (4) fixed to the end of the axis of the automatic activation device (3), so as to push and/or retract the lever (5) which in turn pushes and/or retracts the blocking element (1).

A further embodiment of the locking/unlocking system in question is that it can optionally include, at least: a sound, light and/or vibration emitter; an inclination measuring device; and/or a means of transmitting information, either wired or wireless, in order to warn the user of certain conditions of the locking/unlocking system, for example: if the blocking element (1) is in a blocking or unblocking position; when the traction system actuated by pedal levers has a certain angle of inclination and/or when the pedal levers (9) have a certain angle of inclination.

The present invention also contemplates a pedal lever (9), for traction systems actuated by pedal levers, which includes: a locking/unlocking system, as proposed by the present invention. Therefore, the said pedal lever (9) has a cavity (9a) which houses the locking/unlocking system, except for the receiving element (10) and the conductor element (11); a first perforation (22) through which the coupling section (1a) exits from the blocking element (1), so as to couple with the coupling means (10a) of the receiving element (10); a second perforation (24) placed on the end where the first perforation is located (22), so as to connect to a traction system actuated by pedal levers; a third perforation (23) on the opposite end of the second perforation (24), which connects to a pedal (14).

Optionally, the pedal lever can include a fastening means (14a) located on its pedal (14), so as to fasten the pedal (14) to the foot of the user, and the fastening means (14a) can be: staples, magnets, hoops, loops, girdles, Velcro and clasps.

A mode of the pedal lever (9) is when it also includes a freewheel (6) equipped with ball and/or plain bearings, concentrically placed within the second perforation (24).

Another mode of the said pedal lever (9) is when it includes a freewheel adapter (7), concentrically placed within the freewheel (6).

An additional embodiment of the lever (9) in question, is when it includes at least one cap (18) that covers, at least, the cavity (9a), once the part of the locking/unlocking system that has to be on the interior is effectively inside.

Therefore, another object of the present invention is a traction system actuated by pedal levers, which has a central axis (8) mounted on two wheels or bearings (13), that in turn are located inside a tubular shell (12); in which the said traction system includes: a pedal lever (9) like the one described in the present invention, on each of the two ends of the central axis (8), which is introduced and fastened to the freewheel adapter (7), or directly to the freewheel (6), of the said pedal lever (9); a receiving element (10) mounted concentrically on each of the ends of the central axis (8), between the pedal lever (9) and the tubular shell (12), in which the coupling means (10a) of each receiving element (10) are aligned at 180° between them; and a conductor element (11) located on one of the ends of the central axis (8).

A variation of the traction system actuated by pedal levers, of the present invention, is when only one of the switches, either wired or wireless, of the two blocking/unblocking systems of the said traction system, turns the two means of control (16) on and/or off. It is therefore possible to have a mode in which one of the two blocking/unblocking systems lacks a switch, either wired or wireless; or in case one of the switches, either wired or wireless, should fail, the automatic functioning of the locking/unlocking system would not be affected.

Another mode of the traction system actuated by pedal levers, of the present invention, is when only one of the means of control (16), of the two blocking/unblocking systems of the said traction system, controls the two automatic activation means (3). There is therefore the possibility of a mode in which one of the blocking/unblocking systems lacks a means of control (16); or in case one of the means of control (16) should fail, the automatic functioning of the locking/unlocking system would not be affected.

Therefore, a mode of the traction system in question is when the conductor element (11) is united to one of the receiving elements (10). A preferable embodiment of the said traction system is when the receiving element (10) and the conductor element (11) are part of a single piece.

Another additional mode of the traction system of the present invention, is when the switch (15a, 15b), of the locking/unlocking system, is on the exterior lateral face, and/or the upper and/or lower face of the pedal lever (9); and/or mounted on a handle (not illustrated) of the traction system actuated by pedal levers. In this case the handle can be extensible and/or retractable, with the purpose of enhancing the posture of the user, when both blocking/unblocking systems are in an unblocking position.

In this way a traction system actuated by pedal levers (9) has been obtained as proposed in the present invention, whose functioning is explained through the example of the traction system of a bicycle: after the switch (15a or 15b) is activated, it in turn activates the means of control (16) located on the interior of each pedal lever (9), which allows the power source (14) to supply energy to the automatic activation means (3), thus succeeding in making the cam (4) that is connected to the end of the axis of the said activating means (3), to rotate until a first specific position and push the lever (5) which, being connected to the blocking element (1), shifts the latter toward the interior of the pedal lever (9), thus bringing about the uncoupling of the locking/unlocking system from its receiving element (10).

In the same way, the switch is activated (15a or 15b) in order to rotate the cam once again (4) until a second specific position, which prevents the said cam (4) from continuing to push the lever (5), and through the spring (2) pushes the blocking element (1) outside the pedal lever (9), coupling in this way the locking/unlocking system once again to its respective receiving element (10), thus blocking the axis (8).

When each locking/unlocking system is uncoupled from its respective receiving element (10), the force exerted on a pedal (14) located on one of the ends of the pedal lever (9), is directly transmitted to the freewheel (6) located axially on the interior of the said pedal lever (9), in which the said force is in turn transmitted to the adapter (7) of the freewheel (6) which permits the force to be transmitted from the freewheel (6) to the central axis (8), which is a common axis between both pedal levers (9) and rotates axially mounted on at least 2 wheels or bearings (13) located on the interior of a tubular shell (12) of the bicycle; in which the said tubular shell (12) is part of what is known as the "bicycle frame"; in which the central axis (8) is in turn assembled together with the receiving element (10) of each pedal lever (9), considering also that preferably only one of the receiving elements (10) is assembled together with the conductor element (11) such as a cogwheel, a pulley, a cog, etc.; succeeding in this way that only when each pedal lever (9) moves in a specific direction of rotation, through the freewheels (6) the force is transmitted to the conductor element (11), and when the said pedal levers (9) rotate in the opposite direction, they may rotate freely and without transmitting force.

When each locking/unlocking system is coupled with its respective receiving element (10), it means that the blocking element (1) is out of the pedal lever (9) and coupled with its respective receiving element (10) by way of a coupling means (10a), such as a perforation located on the said receiving element (10), considering that the coupling means (10a) of a receiving element (10) must be located preferably at 180° in relation to the coupling means (10a) of the other receiving element (10), thus ensuring that when the locking/unlocking system of each pedal lever (9) is coupled, each pedal lever (9) is positioned at 180° from each other; so that the force exerted on the pedal (14) is transmitted through the pedal lever (9) until the blocking element (1), which in turn transmits the force to the receiving element (10), and it in turns transmits the force to the central axis (8), at the same time that the receiving element (10) which is assembled together with the conductor element (11) also transmits that force to the said conductor element (11).

Some of the advantages of the locking/unlocking system of the present invention consists in the fact that it is provided with, at least: a switch, either wired or wireless, a power source (17), a means of control (16) and an automatic activating means (3) for activating the automatic blocking and unblocking of each pedal lever (9), without the user having to make a physical effort for bringing about the blocking and unblocking.

It is worth mentioning that traction systems actuated by pedal levers can be the traction systems for the following machines or devices: common bicycles, mountain bicycles, racing bicycles, spinning bicycles, tricycles, quadricycles, pedalos or paddle boats, to mention a few examples.

It is worth mentioning that the blocking means (1), of the locking/unlocking system, can also be mechanically moved with the hand and/or foot of the user, which is important in case of failure of the automatic system.

What is claimed is:

1. A bicycle crank assembly, comprising:
   a spindle having an axial axis;
   a receiving element disposed on the spindle, the receiving element comprising a locking bore;
   a crank arm operatively coupled to the spindle, the crank arm comprising:
   a cavity,
   an actuator disposed within the cavity;
   a locking pin including an axial axis;
   wherein the actuator is configured to extend the locking pin along a first direction parallel to the axial axis of the spindle and engage the locking bore of the receiving element, the engagement of the locking pin with the locking bore operatively coupling the crank arm, receiving element, and spindle;
   wherein the actuator is configured to retract the locking pin from the locking bore along a second direction parallel to the axial axis of the spindle and disengage the locking pin from the locking bore, the disengagement of the locking pin from the locking bore operatively decoupling the crank arm from the receiving element.

2. The bicycle crank assembly according to claim 1, wherein:
   the locking pin comprises a coupling section and a retraction section;
   the coupling section has a larger diameter than the retraction section.

3. The bicycle crank assembly according to claim 2, further comprising a spring disposed around the retraction section.

4. The bicycle crank assembly according to claim 2, further comprising a stop disposed on a free end of the retraction section.

5. The bicycle crank assembly according to claim 1, further comprising a cam and a lever operatively connecting the actuator to the locking pin.

6. The bicycle crank assembly according to claim 1, further comprising:
   a shaft extending from the actuator;
   a gear disposed on the shaft;
   teeth formed on the locking pin, and the gear is configured to engage the teeth in order to operatively connect the actuator to the locking pin.

7. The bicycle crank assembly according to claim 1, further comprising a controller disposed within the cavity and configured to control operation of the actuator.

8. The bicycle crank assembly according to claim 7, further comprising a power source for powering the actuator and the controller, the power source disposed within the cavity.

9. The bicycle crank assembly according to claim 8, wherein the actuator is an electric motor.

10. The bicycle crank assembly according to claim 7, further comprising a switch for activating the controller.

11. The bicycle crank assembly according to claim 1, further comprising a cover covering the cavity.

12. The bicycle crank assembly according to claim 1, wherein the crank arm has a first end and a second end.

13. The bicycle crank assembly according claim 12, wherein the first end of the crank arm comprises a first bore and a pedal is attached to the first bore.

14. The bicycle crank assembly according to claim 13, wherein the second end of the crank arm comprises a second bore and a third bore.

15. The bicycle crank assembly according to claim 14, wherein the locking pin is configured to extend and retract through the third bore.

16. The bicycle crank assembly according to claim 14, further comprising a free wheel disposed within the second bore.

17. The bicycle crank assembly according to claim 16, further comprising a free wheel adapter disposed between the free wheel and the spindle.

18. The bicycle crank assembly according to claim 1, further comprising bearings disposed between the spindle and a bike shell.

19. The bicycle crank assembly according to claim 1, further comprising: a sprocket disposed on the spindle.

20. The bicycle crank assembly according to claim 19, wherein the receiving element is attached to the sprocket.

\* \* \* \* \*